United States Patent
Moradi et al.

(10) Patent No.: US 11,144,423 B2
(45) Date of Patent: Oct. 12, 2021

(54) DYNAMIC MANAGEMENT OF MONITORING TASKS IN A CLOUD ENVIRONMENT

(71) Applicant: Telefonaktiebolaget LM Ericsson (publ), Stockholm (SE)

(72) Inventors: Farnaz Moradi, Stockholm (SE); Catalin Meirosu, Sollentuna (SE); Christofer Flinta, Stockholm (SE); Andreas Johnsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 16/472,180

(22) PCT Filed: Dec. 28, 2016

(86) PCT No.: PCT/SE2016/051319
§ 371 (c)(1),
(2) Date: Jun. 20, 2019

(87) PCT Pub. No.: WO2018/124949
PCT Pub. Date: Jul. 5, 2018

(65) Prior Publication Data
US 2020/0019485 A1   Jan. 16, 2020

(51) Int. Cl.
*G06F 11/30* (2006.01)
*G06F 8/65* (2018.01)
(Continued)

(52) U.S. Cl.
CPC ............ *G06F 11/3096* (2013.01); *G06F 8/65* (2013.01); *G06F 9/44505* (2013.01);
(Continued)

(58) Field of Classification Search
CPC ............ G06F 11/3495; G06F 11/3006; G06F 11/302; G06F 11/3055; G06F 11/3093; G06F 8/65; G06F 9/44505; G06F 9/4881
See application file for complete search history.

(56) References Cited

U.S. PATENT DOCUMENTS

| 6,363,056 | B1 | 3/2002 | Beigi et al. |
| 6,493,755 | B1 | 12/2002 | Hansen et al. |

(Continued)

FOREIGN PATENT DOCUMENTS

| WO | 20151038604 A1 | 3/2015 |
| WO | 20161115406 A1 | 7/2016 |

OTHER PUBLICATIONS

Croce et al., "Large-Scale Available Bandwidth Measurements: Interference in Current Techniques," IEEE Transactions on Network and Service Management, vol. 8, No. 4, Dec. 2011, pp. 361-374.
(Continued)

*Primary Examiner* — Jacob D Dascomb
(74) *Attorney, Agent, or Firm* — Nicholson De Vos Webster & Elliott LLP

(57) ABSTRACT

A method and network device for resource-aware dynamic monitoring of application units is described. Instantiation of a monitoring element is caused. A first usage status of resources is obtained. Configuration parameters of the monitoring element are set based upon the first usage status of the resources. The monitoring element is scheduled based upon the first usage status of the resources. A second usage status of the resources is obtained. A determination is performed of whether to update the monitoring element based upon the second usage status of the resources. Responsive to determining that the monitoring element is to be updated, at least one of the following is performed: (i) updating the one or more configuration parameters of the monitoring element
(Continued)

based upon the second usage status of the resources, and (ii) rescheduling the monitoring element based upon the second usage status of the resources.

21 Claims, 9 Drawing Sheets

(51) Int. Cl.
*G06F 9/445* (2018.01)
*G06F 9/48* (2006.01)
*G06F 11/34* (2006.01)

(52) U.S. Cl.
CPC .......... *G06F 9/4881* (2013.01); *G06F 11/302* (2013.01); *G06F 11/3006* (2013.01); *G06F 11/3055* (2013.01); *G06F 11/3495* (2013.01)

(56) References Cited

U.S. PATENT DOCUMENTS

| | | | |
|---|---|---|---|
| 6,560,648 B1 | 5/2003 | Dunn et al. | |
| 6,763,380 B1 | 7/2004 | Mayton et al. | |
| 7,636,321 B1 | 12/2009 | Iannaccone et al. | |
| 8,018,943 B1 | 9/2011 | Pleshek et al. | |
| 8,098,677 B1 | 1/2012 | Pleshek et al. | |
| 8,600,726 B1 | 12/2013 | Varshney et al. | |
| 9,400,682 B2* | 7/2016 | Persikov | G06F 11/3096 |
| 9,658,937 B2* | 5/2017 | Christodorescu | G06F 11/3051 |
| 9,785,468 B2* | 10/2017 | Mitchell | G06F 11/3442 |
| 10,264,020 B1 | 4/2019 | Nanda et al. | |
| 10,411,985 B1 | 9/2019 | Miller et al. | |
| 10,489,201 B2* | 11/2019 | Buendgen | G06F 9/4881 |
| 2002/0120727 A1 | 8/2002 | Curley et al. | |
| 2002/0131369 A1 | 9/2002 | Hasegawa et al. | |
| 2002/0161755 A1 | 10/2002 | Moriarty | |
| 2006/0039538 A1 | 2/2006 | Minnis et al. | |
| 2006/0072466 A1 | 4/2006 | Wang et al. | |
| 2006/0294439 A1 | 12/2006 | Rolia et al. | |
| 2007/0281623 A1 | 12/2007 | Liu | |
| 2009/0150996 A1 | 6/2009 | Haswell | |
| 2009/0172148 A1 | 7/2009 | Underwood | |
| 2011/0004698 A1 | 1/2011 | Wu | |
| 2012/0079107 A1 | 3/2012 | Williams et al. | |
| 2013/0006601 A1 | 1/2013 | Mlinarsky et al. | |
| 2013/0031233 A1 | 1/2013 | Feng et al. | |
| 2013/0036416 A1 | 2/2013 | Raju et al. | |
| 2013/0291109 A1 | 10/2013 | Staniford et al. | |
| 2014/0157407 A1 | 6/2014 | Krishnan et al. | |
| 2014/0229605 A1 | 8/2014 | Besser | |
| 2014/0310377 A1 | 10/2014 | Matsuoka | |
| 2014/0337674 A1 | 11/2014 | Ivancic et al. | |
| 2014/0351414 A1* | 11/2014 | Rosensweig | H04L 43/0817 709/224 |
| 2015/0044973 A1 | 2/2015 | Siomina | |
| 2015/0244617 A1 | 8/2015 | Nakil et al. | |
| 2015/0263889 A1 | 9/2015 | Newton | |
| 2015/0319030 A1 | 11/2015 | Nachum | |
| 2015/0326457 A1 | 11/2015 | Wu et al. | |
| 2015/0333993 A1 | 11/2015 | Welin et al. | |
| 2016/0014073 A1 | 1/2016 | Reddy et al. | |
| 2016/0026789 A1 | 1/2016 | Martini et al. | |
| 2016/0048407 A1 | 2/2016 | Alicherry et al. | |
| 2016/0087861 A1 | 3/2016 | Kuan et al. | |
| 2016/0094418 A1 | 3/2016 | Raney | |
| 2016/0099853 A1 | 4/2016 | Nedeltchev et al. | |
| 2016/0110211 A1 | 4/2016 | Karnes | |
| 2016/0149788 A1 | 5/2016 | Zhang et al. | |
| 2016/0226726 A1 | 8/2016 | Rao | |
| 2016/0274991 A1 | 9/2016 | Christodorescu et al. | |
| 2016/0277249 A1 | 9/2016 | Singh et al. | |
| 2016/0283307 A1 | 9/2016 | Takeshima et al. | |
| 2016/0357424 A1 | 12/2016 | Pang et al. | |
| 2016/0357957 A1 | 12/2016 | Deen et al. | |
| 2016/0359889 A1 | 12/2016 | Yadav et al. | |
| 2016/0359913 A1 | 12/2016 | Gupta et al. | |
| 2016/0380865 A1 | 12/2016 | Dubal et al. | |
| 2017/0041750 A1 | 2/2017 | Jose et al. | |
| 2017/0060628 A1 | 3/2017 | Tarasuk-Levin et al. | |
| 2017/0075710 A1 | 3/2017 | Prasad et al. | |
| 2017/0078198 A1 | 3/2017 | Nellikar et al. | |
| 2017/0099195 A1 | 4/2017 | Raney | |
| 2017/0111246 A1 | 4/2017 | Shaw et al. | |
| 2017/0118102 A1 | 4/2017 | Majumder et al. | |
| 2017/0163510 A1 | 6/2017 | Arora et al. | |
| 2017/0171159 A1 | 6/2017 | Kumar et al. | |
| 2018/0123928 A1 | 5/2018 | Moradi et al. | |
| 2018/0152369 A1 | 5/2018 | McCallen et al. | |
| 2018/0167294 A1 | 6/2018 | Gupta et al. | |
| 2020/0310846 A1 | 10/2020 | Moradi et al. | |

OTHER PUBLICATIONS

Felter et al., "An Updated Performance Comparison of Virtual Machines and Linux Containers," IEEE, 2015, pp. 171-172.
Gangam et al., "Mitigating Interference in a Network Measurement Service", 2011 IEEE Nineteenth IEEE International Workshop on Quality of Service, IEEE, 2011, pp. 1-9.
Guo et al., "Pingmesh: A Large-Scale System for Data Center Network Latency Measurement and Analysis," SIGCOMM'15, Aug. 17-21, 2015, pp. 139-152.
Huang et al., "Measurement-Aware Monitor Placement and Routing: A Joint Optimization Approach for Network-Nide Measurements," IEEE Transactions on Network and Service Management, vol. 9, No. 1, Mar. 2012, pp. 48-59.
International Preliminary Report on Patentability received for PCT Patent Application No. PCT/SE2016/050430, dated Nov. 22, 2018, 9 pages.
International Preliminary Report on Patentability received for PCT Patent Application No. PCT/SE2016/051319, dated Jul. 11, 2019, 8 pages.
International Search Report and Written Opinion for Application No. PCT/SE2016/050430, dated Sep. 22, 2016, 11 pages.
International Search Report and Written Opinion received for PCT Patent Application No. PCT/SE2016/051319, dated Oct. 10, 2017, 9 pages.
RFC 5357: Hedayat et al., "A Two-Way Active Measurement Protocol (TWAMP)," Network Working Group, Request for Comments: 5357, Oct. 2008, 26 pages.
Tillenius et al., "Resource-Aware Task Scheduling", ACM Transactions on Embedded Computing Systems, vol. 14, No. 1, Article 5, Jan. 2015, 25 pages.
Xia et al., "Resource Optimization for Service Chain Monitoring in Software-Defined Networks," Fourth European Workshop on Software Defined Networks, 2015, pp. 91-96.
Yu et al., "Distributed and Collaborative Traffic Monitoring in Software Defined Networks," HotSDN'14, Aug. 22, 2014, 6 pages.
Zhang et al., "HELM: Conflict-Free Active Measurement Scheduling for Shared Network Resource Management", 2015 IFIP/IEEE International Symposium on Integrated Network Management (IM), May 2015, 9 pages.
Baillargeon et al., "Ericsson Two-Way Active Measurement Protocol (TWAMP) Value-Added Octets", Internet Engineering Task Force (IETF), Request for Comments: 6802, Nov. 2012, pp. 1-16.
Communication pursuant to Article 94(3) EPC for EP Application No. 16728417.3, dated Apr. 14, 2020, 5 pages.
Duche et al.," Round Trip Delay Time as a Linear Function of Distance Between the Sensor Nodes in Wireless Sensor Network", International Journal of Engineering Sciences & Emerging Technologies, vol. 1, Issue 2, Feb. 2012, pp. 20-26.
ETSI GS NFV 003 V1.1.1, "Network Functions Virtualisation (NFV); Terminology for Main Concepts in NFV," Oct. 2013, 10 pages, European Telecommunications Standards Institute.
International Search Report and Written Opinion, PCT App. No. PCT/EP2017/071355, dated May 15, 2018, 10 pages.
Non Final Office Action, U.S. Appl. No. 16/300,530, dated Nov. 4, 2020, 19 pages.

(56) References Cited

OTHER PUBLICATIONS

Postel, J., "Internet Control Message Protocol, Darpa Internet Program Protocol Specification", Network Working Group, Request for Comments: 792, Sep. 1981, pp. 1-21.
RFC 5357: Hedayat et al., "A Two-Way Active Measurement Protocol (TWAMP)," Network Working Group, Reques for Comments: 5357, Oct. 2008, 26 pages.
Schuss et al., "A Competition to Push the Dependability of Low-Power Wireless Protocols to the Edge", EWSN '17: Proceedings of the 2017 International Conference on Embedded Wireless Systems and Networks, 2017, 12 pages.
Wennerstrom et al., "A Long-Term Study of Correlations between Meteorological Conditions and 802.15.4 Link Performance", 2013 IEEE International Conference on Sensing, Communications and Networking (SECON), IEEE, 2013, pp. 221-229.
Wolosz et al., "A measurement study of predicting throughput from LQI and RSSI", Computer Sciences, Dependable Communication and Computation Systems, 2012, 12 pages.
Communication pursuant to Article 94(3) EPC, EP App. No. 16728417.3, Mar. 2, 2021, 5 pages.
International Preliminary Report on Patentability, PCT App. No. PCT/EP2017/071355, Mar. 5, 2020, 9 pages.
Final Office Action, U.S. Appl. No. 16/300,530, dated Mar. 17, 2021, 19 pages.
Non-Final Office Action, U.S. Appl. No. 16/634,557, dated Mar. 29, 2021, 13 pages.
Intention to Grant, EP App. No. 17758856.3, Apr. 13, 2021, 5 pages.
Advisory Action, U.S. Appl. No. 16/300,530, dated Jun. 16, 2021, 3 pages.

\* cited by examiner

DYNAMIC MANAGEMENT OF MONITORING TASKS IN A CLOUD ENVIRONMENT

CROSS-REFERENCE TO RELATED APPLICATIONS

This application is a National stage of International Application No. PCT/SE2016/051319, filed Dec. 28, 2016, which is hereby incorporated by reference.

TECHNICAL FIELD

Embodiments of the invention relate to the field of cloud computing; and more specifically, to the dynamic management of monitoring tasks in a cloud environment.

BACKGROUND

Compute and network performance monitoring is critical to evaluate the overall performance of applications and services on cloud environments and identify and diagnose performance bottlenecks. A key challenge related to large-scale measurements is the fact that the measurement methods themselves consume compute and network resources. One example is active network measurements. An active monitoring function (i.e., probe) running on a first network device, injects probe packets in the network which are received in another network device. The probe packets can be collected in the receiver network device or reflected to the sender network device. Some measurements require the probe packets to be timestamped in both the sender and the receiver at sending and arrival events. In this way one could study interactions between probe packets and the cross traffic and draw conclusions about the network characteristics and the cross traffic dynamics.

In case of active network measurements, the overhead in terms of consumed capacity can become critical if the measured paths partly overlap. Running multiple active measurements at the same time over the same path can lead to "measurement conflicts", where probe packets of one measurement tool are viewed as user traffic by another tool. Measurement conflicts can result in faulty measurements. For example, it has been shown that overlapping links of measurement paths may bias metric estimation due to interference in the network. Additionally, overlapping use of compute resources by CPU intensive monitoring functions can also lead to measurement conflicts and inaccurate measurement results, e.g., by affecting the accuracy of the timestamp information. In addition to active network measurements, transfer of monitoring results from a node to another (e.g., transfer of passively captured traffic traces), can consume compute and network resources, and affect the performance of applications.

Task scheduling is a widely studied problem. As an example, in a known scheduling approach the scheduling of tasks is considered with respect to the inter-dependencies between the tasks as well as their usage of resources such as memory and bandwidth. In this approach, a scheduler obtains resource consumption from the user annotations of the task in order to schedule them. However, the scheduler cannot modify or re-configure the tasks in order to adapt them to the available resources.

Further a variety of approaches have considered the scheduling problem of active measurement tasks to prevent measurement conflicts while satisfying the measurement requirements. For example, some approaches consider scheduling measurement tasks with the goal of reducing inference (e.g., M. Zhang, M. Swany, A. Yavanamanda and E. Kissel, "HELM: Conflict-free active measurement scheduling for shared network resource management," 2015 *IFIP/IEEE International Symposium on Integrated Network Management* (IM), Ottawa, ON, 2015, pp. 113-121). In another example, a centralized scheduler is used to schedule latency measurements between servers in a datacenter or between datacenters with the objective of achieving full coverage of the network (e.g., "Pingmesh: A Large-Scale System for Data Center Network Latency Measurement and Analysis" Chuanxiong Guo, Lihua Yuan, Dong Xiang, Yingnong Dang, Ray Huang, Dave Maltz, Zhaoyi Liu, Vin Wang, Bin Pang, Hua Chen, Zhi-Wei Lin, Varugis Kurien, Microsoft, Midfin Systems).

However the existing monitoring approaches and their scheduling include several disadvantages. Centralized scheduling solutions of monitoring tasks do not have access to compute resource utilization of servers and cannot schedule local monitoring tasks, (e.g., monitoring communication between applications within one server hosting the application units). Further, current solutions only consider resource conflicts for performing measurements and do not consider other monitoring-related tasks such as transfer of monitoring results. Current solutions are optimized for static placement of long-lived probes in topologies that experience little change. In addition, existing solutions only schedule pre-configured monitoring tasks and cannot re-configure the monitoring tasks to optimize the scheduling.

There is a need for a solution that enables dynamic reconfiguration and scheduling of monitoring task that is adaptable to changes that occur in network and in resources usage, in order to provide efficient usage of resources and accurate measurement results.

SUMMARY

In a first broad aspect, a method for resource-aware dynamic monitoring of application units is described. The method comprises causing instantiation of a monitoring element operative to monitor an activity of one or more application units which are part of a network; obtaining a first usage status of resources which are to be used by the monitoring element when in operation; setting one or more configuration parameters of the monitoring element based upon the first usage status of the resources; and scheduling the monitoring element based upon the first usage status of the resources, where scheduling the monitoring element causes the monitoring element to start monitoring the one or more application units at a predetermined start time. The method continues with obtaining a second usage status of the resources; and determining whether to update the monitoring element based upon the second usage status of the resources. The method continues with, responsive to determining that the monitoring element is to be updated, performing at least one of the following: (i) updating the one or more configuration parameters of the monitoring element based upon the second usage status of the resources, and (ii) rescheduling the monitoring element based upon the second usage status of the resources.

In a second broad aspect, a network device for resource-aware dynamic monitoring of application units, is described. The network device being configured to cause instantiation of a monitoring element operative to monitor an activity of one or more application units which are part of a network; obtain a first usage status of resources which are to be used by the monitoring element when in operation; set one or more configuration parameters of the monitoring element based upon the first usage status of the resources; and schedule the monitoring element based upon the first usage status of the resources, wherein scheduling the monitoring element causes the monitoring element to start monitoring the one or more application units at a predetermined start time. The network device is further operative to obtain a second usage status of the resources; and determine whether to update the monitoring element based upon the second usage status of the resources. The network device is further to perform, responsive to determining that the monitoring element is to be updated, at least one of the following: (i) update the one or more configuration parameters of the monitoring element based upon the second usage status of the resources, and (ii) reschedule the monitoring element based upon the second usage status of the resources.

In a third broad aspect, a non-transitory computer readable storage medium that provide instructions, is described. The instruction when executed by a processor, cause said processor to perform operations comprising: causing instantiation of a monitoring element operative to monitor an activity of one or more application units which are part of a network; obtaining a first usage status of resources which are to be used by the monitoring element when in operation; setting one or more configuration parameters of the monitoring element based upon the first usage status of the resources; and scheduling the monitoring element based upon the first usage status of the resources, where scheduling the monitoring element causes the monitoring element to start monitoring the one or more application units at a predetermined start time. The operations further include obtaining a second usage status of the resources; and determining whether to update the monitoring element based upon the second usage status of the resources. The operations further include, responsive to determining that the monitoring element is to be updated, performing at least one of the following: (i) updating the one or more configuration parameters of the monitoring element based upon the second usage status of the resources, and (ii) rescheduling the monitoring element based upon the second usage status of the resources.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
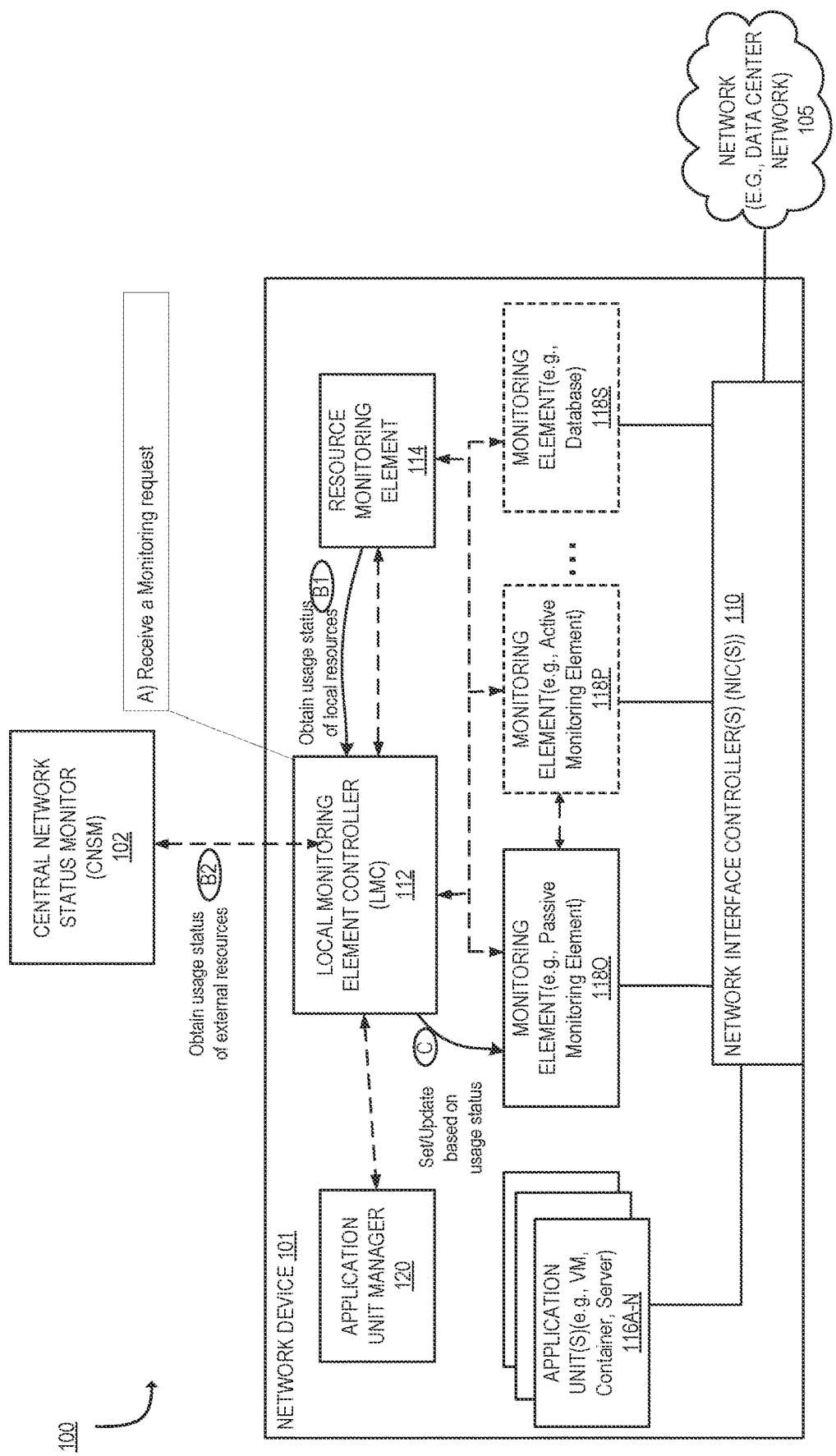
FIG. 1 illustrates a block diagram of an exemplary system for enabling resource-aware dynamic monitoring of application units, in accordance with some embodiments.

The following description describes methods and apparatus for enabling resource-aware dynamic monitoring of application units. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Existing approaches for monitoring tasks performed by application units lack adaptability to network topology changes and/or resources allocation. The embodiments of the present invention present a solution that enables dynamic reconfiguration and scheduling of monitoring task that is adaptable to changes that occur in network and in resources usage, consequently enabling efficient usage of resources and accurate measurement results. The embodiments present methods and apparatuses that can automatically and dynamically configure and schedule different types of monitoring functionalities (e.g., monitoring tasks that include active and passive network measurements, transfer of monitoring results and captured traffic) with the objective of avoiding overloading measurement resources (e.g., CPU, network links, memory, etc.) while providing accurate measurement results. The embodiments present several advantages in cloud environment, by enabling monitoring of virtualized or physical application unit running in a data center. In particular, cloud environments where virtualized applications can be started, stopped, and moved dynamically, the solution of the present invention enable measurement tasks to keep up with the dynamic nature of the applications. Additionally, the monitoring tasks are dynamically configured such that while they provide accurate measurement results they do not eat up the resources (CPU, memory, network links, etc.) used by the application units.

The embodiments present a method and a network device for resource-aware dynamic monitoring of application units. A monitoring element is instantiated. The monitoring element is operative to monitor an activity of one or more application units which are part of a network. A first usage status of resources, where the resources are to be used by the monitoring element when in operation, is obtained. One or more configuration parameters of the monitoring element are set based upon the first usage status of the resources. The monitoring element is scheduled based upon the first usage status of the resources, where the scheduling of the monitoring element causes the monitoring element to start monitoring the one or more application units at a predetermined start time. A second usage status of the resources is obtained. A determination of whether to update the monitoring element based upon the second usage status of the resources, is performed. In response to determining that the monitoring element is to be updated, at least one of the following operations is performed: (i) updating the one or more configuration parameters of the monitoring element based upon the second usage status of the resources, and (ii) rescheduling the monitoring element based upon the second usage status of the resources. In some embodiments, the process of obtaining the usage status of the resources is continuously performed and as a result the monitoring element can be updated and/or rescheduled dynamically based upon the usage status of the resources.

Thus, the embodiments present a method and a network device that constantly obtain the status of shared resources (local and/or external) to adapt the configuration and scheduling of monitoring tasks in reaction to resource utilization changes. The dynamicity of monitoring configuration and scheduling allows minimization of impact on other services running in the cloud environment.

FIG. 1 illustrates a block diagram of an exemplary system for enabling resource-aware dynamic monitoring of application units, in accordance with some embodiments. The system 100 includes a network device (ND) 101 and a central network status monitor (CNSM) 102. ND 101 is communicatively coupled with a network 105 and with CNSM 102. ND 101 is an electronic device that includes a local monitoring controller (LMC) 112, a resource monitoring element 114, an application unit manager 120, one or more application units 116A-N, network interface controller(s) (NIC) 110, and one or more monitors 1180-S. The network 105 couples ND 101 with one or more network devices. In some embodiments, ND 101 is part of a data center in a cloud environment and the network 105 and it is operative to implement a first host of the data center. The network 105 may couple ND 101 to other hosts of the data center, to hosts of other data centers and/or to external networks. The application unit(s) 116A-N may be virtual (Virtual Machines (VM), containers) or physical elements that provide one or more services (e.g., video, audio, analytics, database, SaaS, PaaS, etc.). Each one of the application unit uses physical and network resources of the network device 101.

As will be discussed in further details below, the elements of ND 101 enable a dynamic and resource aware monitoring of the application units 116A-N. LMC 112 is operative to instantiate, configure and schedule the monitors 1180-S. The LMC is operative to receive a monitoring request. The monitoring request includes the type of monitoring task to be performed, as well as the application units to be monitored. In some embodiments, the monitoring task can be executed to monitor several application units. For example, a monitoring element operative to perform a passive monitoring of packets forwarded by an application unit can monitor all packets forwarded by all the application units. Further in some embodiments, the request may include initial configuration parameters for the monitoring task to be performed (e.g., frequency of monitoring, a priority associated with the monitoring task, etc.). The monitoring request information can be received by the LMC 112 from higher management and orchestration levels (e.g., a cloud management unit that is operative to manage the data center). Each LMC maintains a list of the monitoring tasks that should be executed.

The monitors 118O-S are operative to perform the requested monitoring task. Each monitoring element is configurable and schedulable by the LMC 112. In some embodiments, each monitoring element performs one or more types of measurements of the activity of application units 116A-N. For example, a first monitoring element (e.g., Monitoring element 118O) can be used to perform passive measurement of the application units (e.g., capture network traffic transmitted or received by an application unit). In some embodiments passive measurement can be performed by tapping into a switch of ND 101 (e.g., virtual switch or an Ethernet switch). Another monitoring element (e.g., Monitoring element 118P) can be used to perform active measurement between a first application unit and another application unit (which can reside on the ND 101 or on another ND). An active measurement monitoring element injects probe packets in the network which are received in another probe (e.g., another network device coupled with ND 101 through the network 105). The probe packets can be collected in the receiver probe or reflected to the network device 101. In some embodiments, the reflected probe packets can be received and processed by the active measurement monitor. In some embodiments, the probe packets are timestamped in both probes (by the active measurement monitoring element in ND 101 and in the received ND) at sending and arrival events. The active measurement monitoring element can be used to study interaction between probe packets and the cross traffic and draw conclusions about the network characteristics and the cross traffic dynamics.

A monitoring element can be operative to perform analytics by calculating statistics from the measured data (e.g., for performing troubleshooting tasks). In a first embodiments, the analytics monitoring element can reside locally (within ND 101). Alternatively, in a second embodiment, it can be implemented on an external network device in communication with ND 101 to receive the measurements and analyze them. In the first embodiment, an analytics monitoring element also uses local compute resources which are considered when scheduling monitoring tasks. In the second embodiment, the measurement data (e.g., application traffic traces) is transferred for analysis and also consumes shared compute and network resources. In another example, a monitoring element (e.g., monitoring element 118S) can be a database for storing measurement results of one or more monitoring tasks. The monitors are configured/reconfigured, instantiated, stopped, and scheduled/rescheduled by LMC 112. Each monitoring element can be configured to perform periodic monitoring of one or more application units or an on-demand single monitoring task.

ND 101 further includes a resource monitoring element 114. The resource monitoring element 114 is operative to monitor the usage and availability of local physical resources of the ND 101 (e.g., processor(s), memory, network links and interfaces, etc.). Similarly to the monitors 118O-S, the resource monitoring element 114 is also controlled by LMC 112, such that it can be configured/reconfigured, instantiated, stopped, and scheduled/rescheduled by LMC 112. The resource monitoring element can be configured to perform periodic monitoring of the resources or alternatively an on-demand single monitoring task of the resources. The resource monitoring element 114 is operative to determine the status of the resources and transmits it to the LMC 112. Resource usage and availability monitoring can be performed by using various tools such as the SAR tool in Linux (Service Activation Report) or a cAdvisor container for monitoring in a container execution environment. In some embodiments, LMC 112 is operative to communicate with LMCs in other NDs and with CNSM 102 using a Representational State Transfer (REST) API.

ND 101 is further communicatively coupled with CNSM 102. CNSM 102 is a network device operative to transmit the status of external resources (e.g., network resource utilization of the network including the ND 101) to the LMC 112. In one embodiment, the CNSM 102 includes a distributed data store that receives information on network links from various LMCs located in network devices within the network. In this embodiment, the CNSM 102 does not make any decisions and provides the gathered information about the network status to the LMCs when needed. The CNSM 102 receives information about network monitoring elements from different LMCs (e.g., when LMC 112 initiates a monitoring element that performs an active network monitoring task or transfers monitoring data to an external network device, it also forwards this information to the CNSM 102) and uses the information to generate a global view of the measurements occurring in the entire network.

In some embodiments, the global view can be organized as a graph where each node of the graph corresponds to a monitoring endpoint (MEP) and each edge corresponds to a measurement between two endpoints (i.e., an end point of a measurement task performed by a respective monitoring element). The graph can optionally be weighted where edge weights correspond to the type, frequency, and duration of the measurements. CNSM 102 then maps the measurement graph onto the topology graph of the network such that each MEP is associated with a corresponding network device. Several MEPs can be mapped to a single network device.

CNSM 102 continuously receives updates from different LMCs in the network, and upon receipt of the information, it updates the global view (e.g., graph) and the mapping onto the topology of the network. Similarly, when the topology of the network is updated, CNSM 102 updates the mapping. The mapping of two monitoring functions $MEP_i$ and $MEP_j$ is performed by identifying the network devices in the network topology where these monitoring elements are executed, and determining the path between them.

Figure 6:
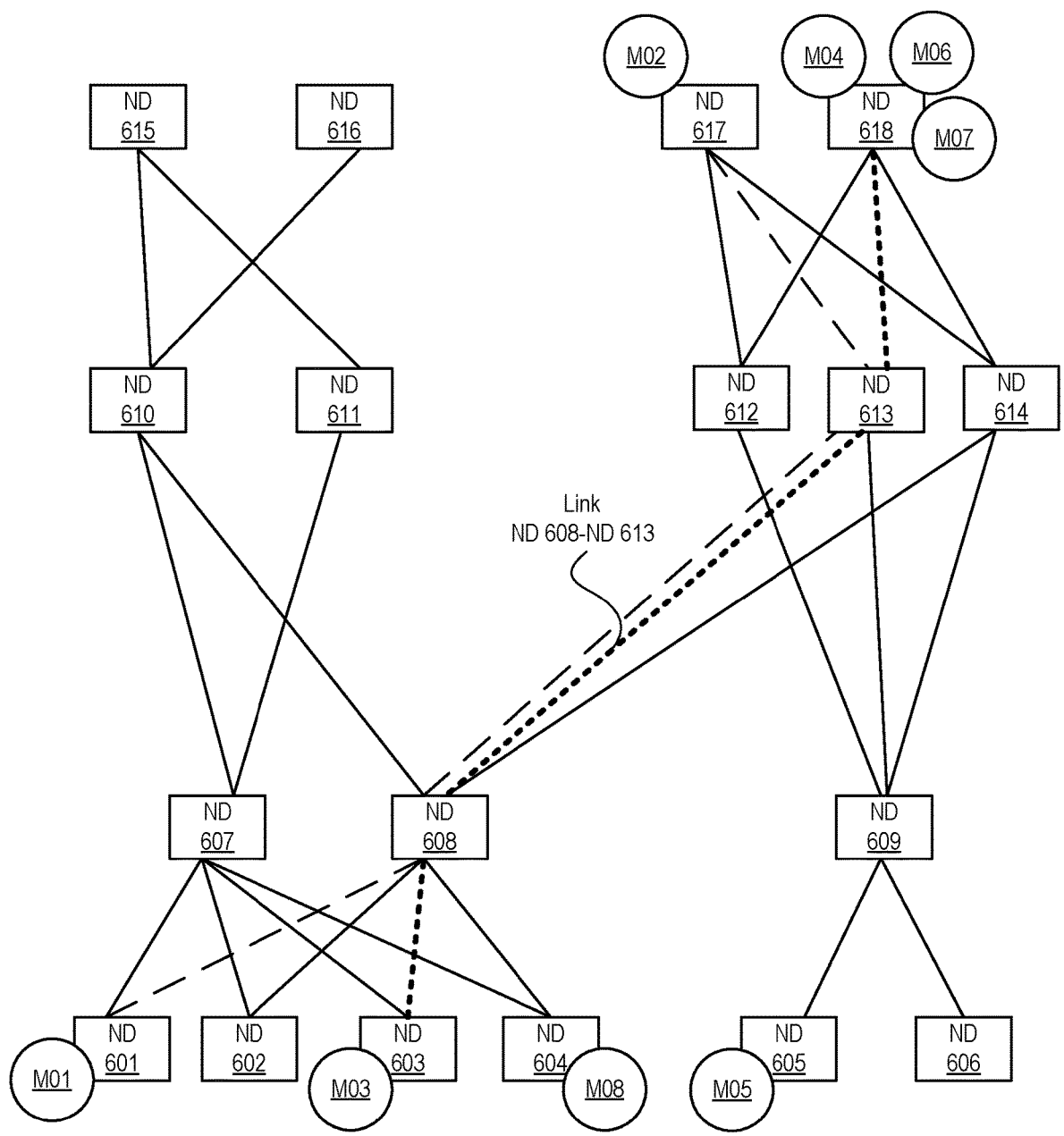
FIG. 6 illustrates an exemplary graph providing a global view of the network topology and mapping of monitoring elements, in accordance with some embodiments.

FIG. 6 illustrates an exemplary graph providing a global view of the network topology and mapping of monitoring elements, in accordance with some embodiments. The graph illustrated in FIG. 6 includes a set of network devices ND601-618 coupled through network links and forming a network. The graph further includes monitoring endpoints (MEP) M01-M08. Each MEP is representative a monitoring element that is in communication with another monitoring element in the network. Each monitoring element is executed within a network device. In some cases, several MEPs are executed within a single ND (e.g., M04, M06, and M07) are executed in ND 618. In the example shown in FIG. 6, measurements between M1-M2 and M3-M4 partially overlap on the network link between network device ND 608 and ND 618.

In some embodiments, the CNSM 102 further performs network overlap detection and stores the information for use by the LMCs in the network. Network overlap detection can be performed at the CNSM 102, whenever the network topology is updated or the network measurements are started, stopped, or modified. In some embodiments, network overlap detection can be performed by assigning a counter/weight to each link on the network topology. When a monitoring element is mapped on a link, the link counter is increased. After mapping of all the monitoring elements, the links and endpoints which have high counters/weights (e.g., when compared with a predetermined threshold) are considered as overloaded resources. LMCs that have to schedule network monitoring elements, receive the overload information from the CNSM 102 and consider it for updating or scheduling the monitoring elements. For example, referring back to FIG. 6, CNSM 102 can determine that the link ND608-ND 613 is overloaded as there is an overlap between two active monitoring tasks.

In some embodiments, in addition to gathering and forwarding the information, the CNSM 102 may act as an admission controller. In this embodiment, the CNSM 102 uses the network overlap information to make a decision about admitting a network monitoring task or not. In some embodiments, CNSM 102 may further use admission decisions based on local resources usage status. In these embodiments, CNSM 102 receives updates to network changes from each ND including an LMC as well as status on the state of usage of the local resources (e.g., CPU and memory usage). Alternatively, when the CNSM 102 does not act as an admission controller for the monitoring elements, it stores the overlap detection information such that it is queried by LMCs.

When a monitoring request is received at operation (A), LMC 112 instantiates a monitoring element for performing the requested monitoring task. At operations (B1-B2), LMC 112 obtains the current status of the resources. In one embodiment, LMC 112 obtains a usage status of the local resources within the network device 101 from the resource monitoring element 114. In some embodiments, in addition or alternatively to the local resources LMC 112 may further obtain the current usage status of the external resources from the CNSM 102 (operation B2). The usage status of the resources (local or external resources) include information regarding the current resource usage of the resources (e.g., the memory usage within ND 101, CPU usage within ND 101, network link utilization within or outside of ND 101, etc.) and the availability of the resources. In some embodiments, if the usage status is not available (e.g., the resource monitoring element is not operating), LMC 112 instantiates the resource monitoring element 114. In some embodiments the resource monitoring element 114 can be instantiated by sending a request to the application unit manager 120. In some embodiments, when the ND 101 includes virtualized network elements (container, virtual machines implementing the different elements of ND 101), the application unit manager 120 is a virtual element manager that is operative to instantiate the different instances of the elements within ND 101.

At operation (C), based upon the usage status obtained, LMC 112 configures the monitoring element with proper parameters for performing the requested monitoring task. The LMC 112 further defines a scheduling strategy for executing the configured monitor. In some embodiments, when the monitoring task involve network resources that are outside ND 101, LMC may inform CNSM 102 about the network resources that will be used during the measurements. For example, if the configured monitoring element is to perform active measurement between ND 101 and another network device, LMC 112 informs the CNSM 102.

Following the instantiation, configuration and scheduling of a first monitoring element to perform a monitoring task of an application unit 116A-N, the LMC 112 continuously obtain usage status of the resources (local and/or external resources) and determines whether to update/reconfigure the monitoring element and/or reschedule the monitoring element such that there is no overload of the resources. For example, as will be described in further details below, if the available resources are not sufficient for the currently scheduled monitoring tasks, the LMC 112 reconfigures the monitoring tasks and/or reschedules them according to the available resources.

The operations in the flow diagrams will be described with reference to the exemplary embodiments of FIG. 1. However, it should be understood that the operations of the flow diagrams can be performed by embodiments of the invention other than those discussed with reference to the FIG. 1, and the embodiments of the invention discussed with reference to FIG. 1 can perform operations different than those discussed with reference to the flow diagrams.

Figure 2:
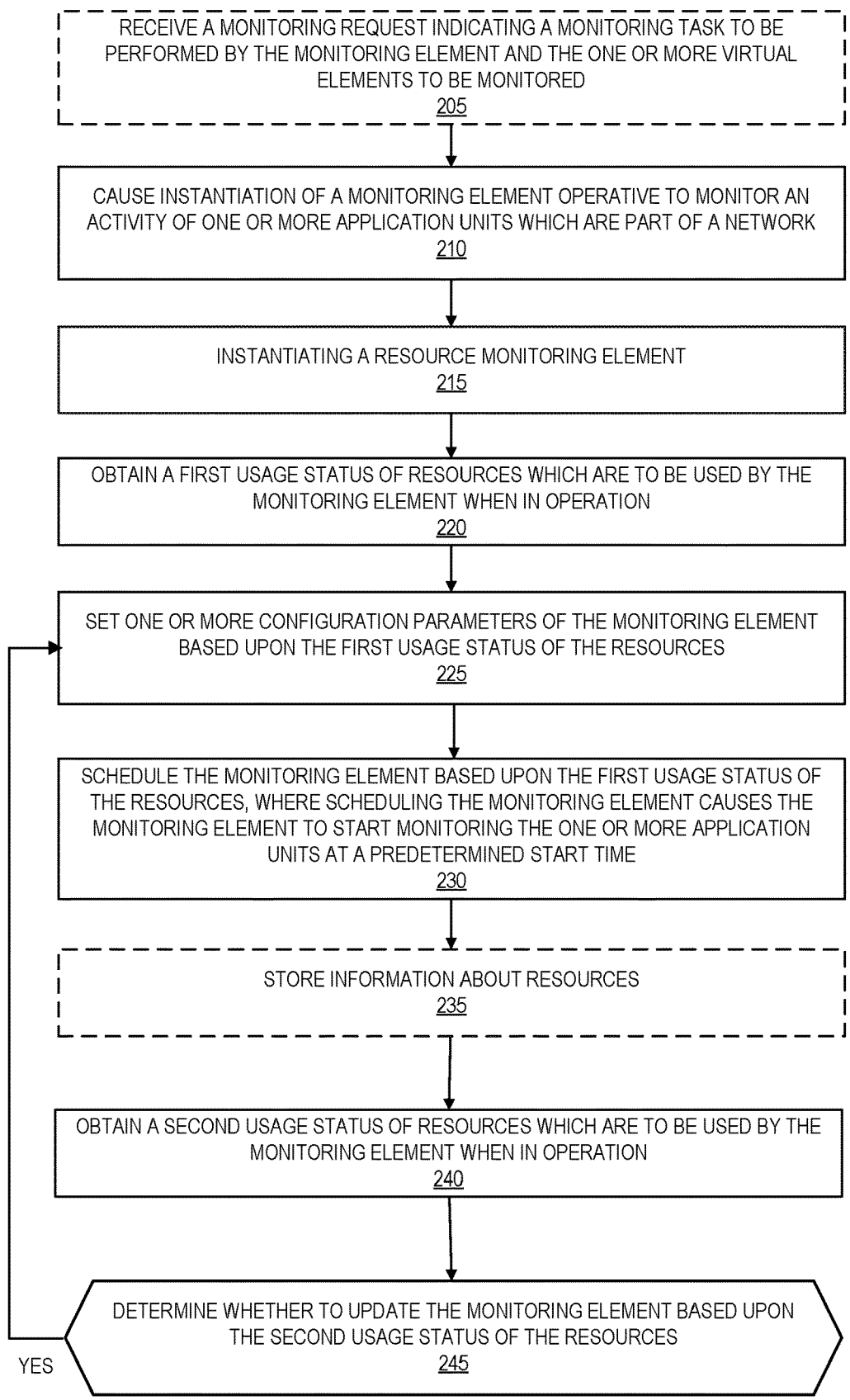
FIG. 2 illustrates a flow diagram of exemplary operations for performing dynamic and resource-aware monitoring in a network device, in accordance with some embodiments.

FIG. 2 illustrates a flow diagram of exemplary operations for performing dynamic and resource-aware monitoring in a network device, in accordance with some embodiments. In some embodiments, the operations of the flow diagram of FIG. 2 are performed by the LMC 112. At operation 205, a monitoring request is received at the LMC 112. The monitoring request information can be received by the LMC 112 from higher management and orchestration levels (e.g., a cloud management unit that is operative to manage the data center). The monitoring request indicates a monitoring task to be performed by a monitoring element and further indicates the set of one or more application units to be monitored. The monitoring task is added to a list of monitoring tasks maintained by LMC 112. The flow of operations moves to operation 210, at which, LMC 112 causes the instantiation of the monitoring element that is to perform the requested monitoring task. For example, in some embodiment, when the monitoring elements are virtual elements (e.g., virtual machines (VMs), or containers), LMC 112 may instruct application unit manager 120 to instantiate the virtual element.

In some embodiments, LMC 112 may optionally perform discovery of the application units to be monitored. When the application units are virtual elements (e.g., VMs/containers), the discovery can be performed by tapping onto hypervisor/container daemon messaging and retrieving application creation and destruction messages. For example, an LMC 112 can listen to event messages generated by the local Docker daemon regarding creation and removal of application containers. Once an application is started, LMC 112 instantiates the required active monitoring function(s) for example inside an active monitoring container. In this way an LMC 112 identifies the measurement endpoints.

In some embodiments, LMC 112 may further perform discovery of application-generated flows. The discovery of the flows enable LMC 112 to be used for discovery of remote monitoring endpoints and pairing the measurement points (i.e., pairing a monitoring element at ND 101 with another monitoring element in an external network device). This can be done by passively observing the application traffic. For example, by tapping onto a virtual switch or physical switch to which the application unit (e.g., container/VM) is connected. Based on the observed application flows, the LMC 112 can then identify the remote measurement endpoint. This information can then be used of the active monitoring sessions of an active monitoring element.

Flow then moves to operation 220, at which a first usage status of resources is obtained. The usage status obtained relates to usage and availability of resources which are to be used by the instantiated monitoring element when in operation. The resources can be local resources (e.g., network links, CPU, memory) or external (e.g., network links and paths with external network devices). When the monitoring task to be executed by the monitoring element requires the use of external network resources (e.g., when the monitoring task is an active measurement between ND 101 and another ND in the network), the LMC 112 also informs the CNSM 102 about the network resources involved in the measurements.

Figure 3:
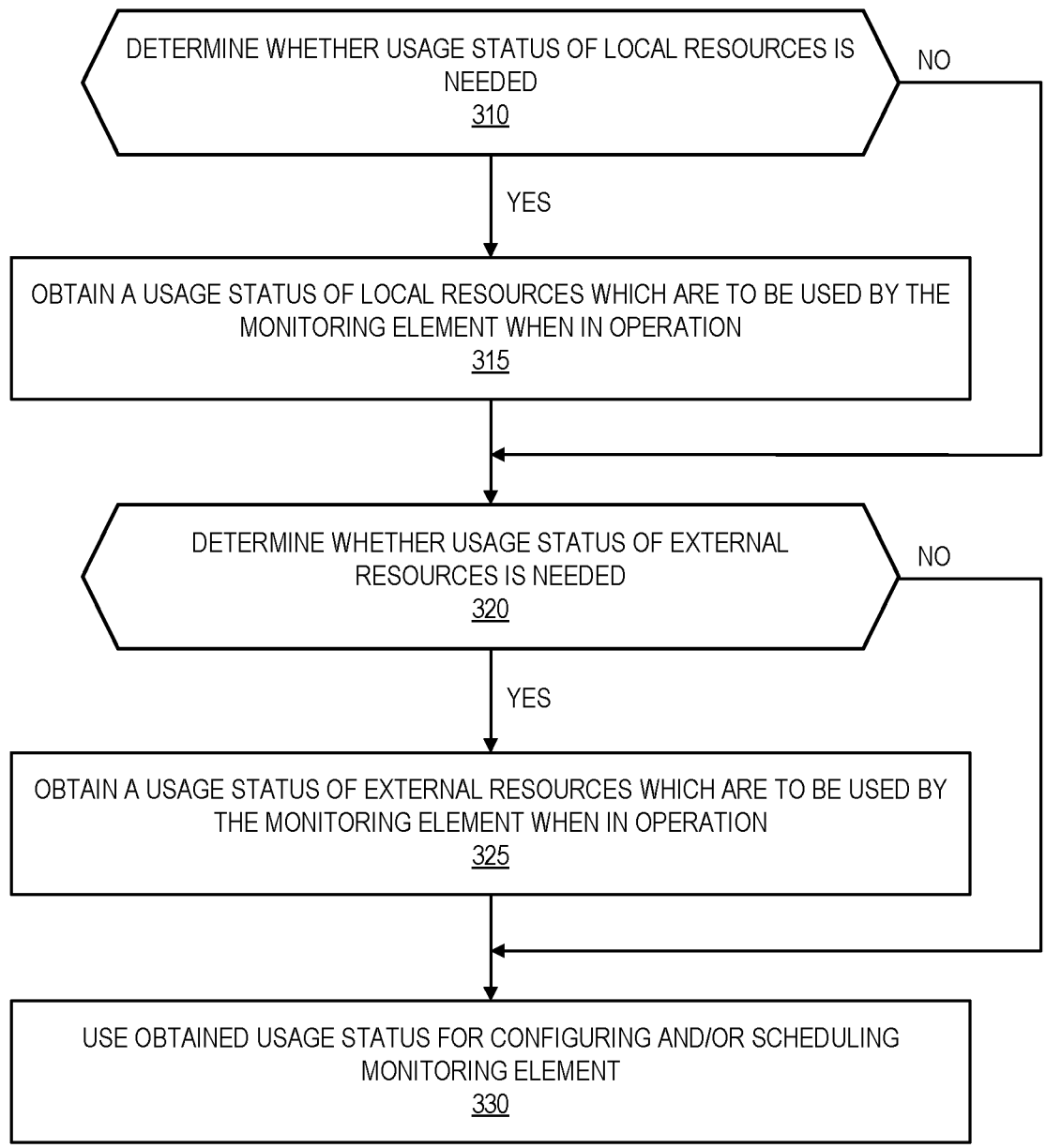
FIG. 3 illustrates a flow diagram of exemplary operations for obtaining usage status resources in accordance with some embodiments.

FIG. 3 illustrates a flow diagram of exemplary operations for obtaining usage status resources in accordance with some embodiments. At operation 310, LMC 112 determines whether usage status of local resources is needed. For example, based upon the type of monitoring task to be performed, LMC 112 may determine which resources will be needed or affected by the monitoring element performing the monitoring task. Thus, if LMC 112 determines that no local resources will be involved the flow of operations moves to operation 320. Alternatively, when it is determined that local resources will be involved, LMC 112 obtains (operation 315) usage status of local resources which are to be used by the monitoring element (i.e., the local resources that will be affected by the operation of the monitoring element). At operation 320, LMC 112 determines whether usage status of external resources is needed. When it is determined that external resources will be involved, LMC 112 obtains (operation 325) usage status of the external resources which are to be used by the monitoring element. In some embodiments, LMC 112 communicates with the CNSM 102 to obtain the status of the external resources. For example, if the monitoring task to be performed is an active measurement between an application unit on ND 101 and an external application unit on another ND coupled with ND 101 through a given path of the network 105, LMC 112 communicates with CNSM 102 to determine the status of the path. In another embodiment, in addition to obtaining the network load from CNSM 102, LMC 112 communicates with a remote LMC (located in a remote ND) to obtain its local resource usage status. For example, for an active network measurement where the receiver (i.e., a monitoring element running on the remote ND and managed by the remote LMC) is to timestamp probe packets, the LMC 112 may need to verify that the remote resources (e.g., CPU) are sufficient to enable the execution of the remote monitoring element (i.e., the receiver that is to timestamp the probe packets). Therefore in this example, LMC 112 is further to obtain the usage status of the local resources of a remote ND.

Alternatively, when LMC 112 determines that no external resources will be involved the flow of operations moves to operation 330. At operation 330, LMC 112 use the obtained usage status (local and/or external) to configure, update the configuration, schedule or update the scheduling of the monitoring element. In a non-limiting scenario, when the monitoring element involve performing a task of local measurement (e.g., measuring the throughput between two local VMs), the configuration and the scheduling is done locally without communicating with CNSM 102. Alternatively, when the monitoring element involve external measurements (e.g., active network monitoring or transfer of monitoring results to a database on an external server), the LMC 112 can query the status of the network resources by communication with the CNSM 102.

Referring back to the flow diagram of FIG. 2, after obtaining the usage status of the resources, LMC 112 configures and schedules the monitoring element. Flow moves to operation 225, at which LMC 112 sets configuration parameters of the monitoring element based upon the usage status obtained. The configuration can be done for example by setting a configuration file of the monitoring element. For example, LMC 112 can configure the frequency of measurements and tune resource utilization of the monitoring element (e.g., CPU usage, memory usage, network link usage) by changing packet sampling rates. In some embodiments, when one or more other monitoring elements are already being executed in ND 101, LMC may determine to adapt the configuration of the newly requested monitoring element based upon the utilization and activity of the previously executed monitoring elements.

At operation 230, LMC 112 schedules the monitoring element based upon the first usage status of the resources. Scheduling the monitoring element causes the monitoring element to start monitoring one or more application units at a predetermined start time by executing the requested monitoring task. LMC 112 schedules the monitoring element with the objective of avoiding any contention on the resources that will be used (e.g., memory, CPU, network link and interfaces within the ND 101, and/or external network resources such as network paths and path endpoints). Overlapping measurement resources (e.g., probe packets being forwarded over network paths also used by data traffic, CPU usage shared with the application units, etc.) can adversely affect the measurement results and can potentially overload the different resources used, and can result in a negative effect on the application units' performance. Thus, in the embodiments presented herein, LMC 112 takes into consideration any potential overlapping resource usage and automatically defines a scheduling strategy for the monitoring element that avoids contention on the shared resources. By using conflict information (i.e., information related to overlapping resources such as CPU, memory, NIs) LMC 112 solves a scheduling problem in order to provide efficient execution of the monitoring element.

A variety of scheduling techniques can be used. In one exemplary embodiment, a first scheduling approach consists in running a single measurement task at any point in time for example using an Earliest Deadline First (EDF) scheduling algorithm. In another exemplary embodiment, Dynamic Priority Scheduling can be used. According to this technique, the scheduling of the monitoring element is dynamically adapted to change and form an optimal configuration in a self-sustained manner. For example, a priority of a monitoring element can be modified based on the current resource consumption. In non-limiting example, when an active monitoring element is already running and a passive monitoring element is to be scheduled, if the CPU consumption increases due to heavy operations performed by an application unit, the priority of the passive monitoring task can be decreased and its scheduling delayed. In another example, if the network becomes the bottleneck, the priority of scheduling the passive monitoring element can be increased while the priority of the active monitoring element can be decreased such that its scheduling is updated or delayed.

Referring back to the flow diagram of FIG. 2, once the monitoring element is configured and scheduled based on the first usage status of the resources, the flow of operations moves to operation 240, at which a second usage status of the resources is obtained. In some embodiments, LMC 112 is configured to periodically receive an update of the usage status of the resources (local or external resources) at predetermined intervals of time. In these embodiments, the second usage status is obtained after the predetermined period of time has elapsed since the receipt of the first usage status. In other embodiments, alternatively or additionally to receiving periodic updates of the resources' usage status, LMC 112 obtains the status of the resources upon occurrence of an event within the ND 101 or a change in the network topology. In particular, in a non-limiting example, when the ND 101 includes virtualized application units (e.g., VMs/Containers), upon determination that there is a change within the virtualized environment (e.g., migration of a monitored application unit, instantiation of a new application unit, application unit stopped, etc.), LMC 112 determines to obtain the current status of the resources (local and/or external resources). For example, whenever an application unit, that is being monitored, is stopped or is migrated to another physical network device, the LMC 112 is notified. In some embodiments, the LMC 112 can be notified by receiving a notification message from other management levels (e.g., from application unit manager 120), the LMC will then stop all the monitoring functions that were application specific. In other embodiments, a discovery process can be used by the LMC 112 in order to identify changes occurring in the application units. Further, a change in the network topology involving the monitoring element (e.g., a remote ND being removed, a link/path removed, changed, or added), or a change in remote storage usage (e.g., remote storage usage increase/decrease or location change), can also cause the LMC 112 to obtain the current status of the resources.

When the new usage status of the resources is obtained, the LMC 112 determines, at operation 245, whether to update the monitoring element based upon the second usage status of the resources. In response to determining that the monitoring element is to be updated, The LMC 112 can update the monitoring element by either adjusting/updating (operation 225) its configuration parameters based upon the second usage status of the resources, and/or rescheduling (operation 230) the monitoring element based upon the second usage status of the resources. The configuration can be done for example by setting a configuration file of the monitoring element or restarting the monitoring element with new input parameters specifying the start time and duration of each session monitoring session.

Figure 5:
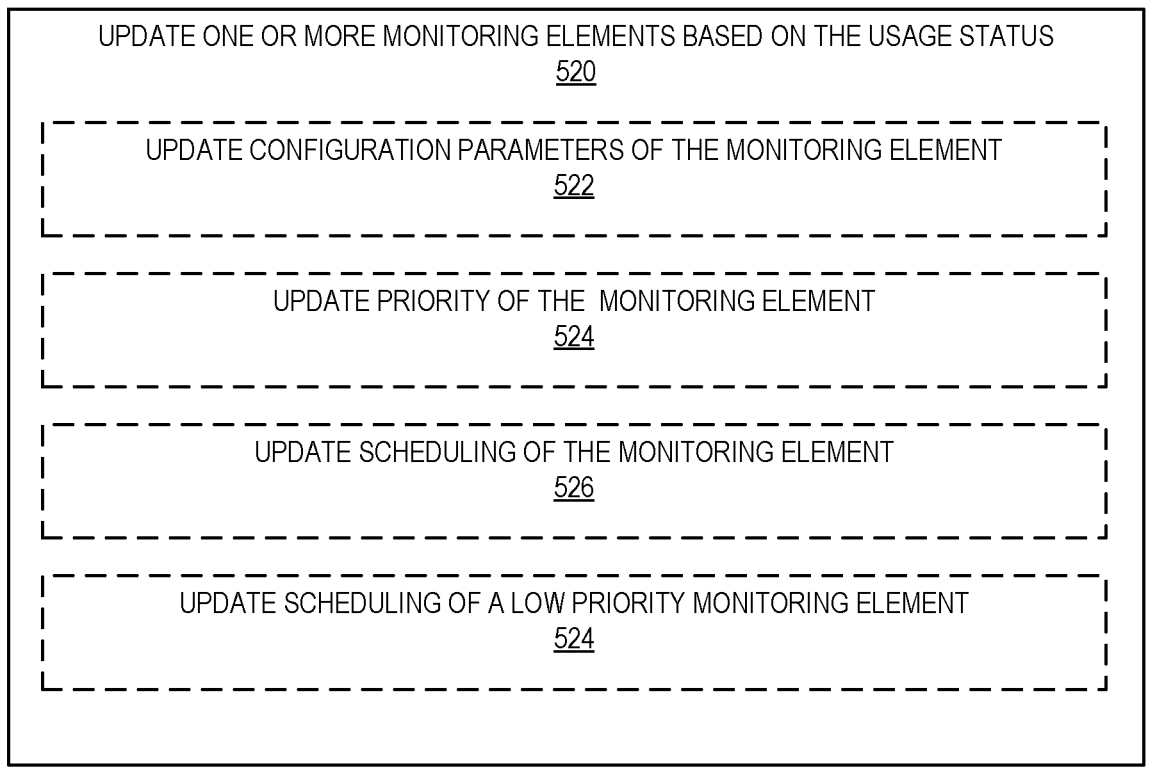
FIG. 5 illustrates a flow diagram of exemplary operations for updating a monitoring element based on the usage status of the resources, in accordance with some embodiments.

FIG. 5 illustrates a flow diagram of exemplary operations for updating a monitoring element based on the usage status of the resources, in accordance with some embodiments. In one embodiments, the LMC 112 can update (operation 522) the configuration parameters of the monitoring element. For example, LMC 112 can configure the frequency of measurements and tune resource utilization of the monitoring element (e.g., CPU usage, memory usage, network link usage) by changing packet sampling rates. In some embodiments, when one or more other monitoring elements are also being executed in ND 101, LMC 112 may determine to adapt the configuration of a subset or all of the monitoring elements based upon the new usage status of the resources obtained.

At operation 524, The LMC 112 can update the priority of the monitoring element. In another embodiment, the LMC 112 may update the scheduling of a monitoring element (operation 526) or a scheduling of a low priority monitoring element 524. For example, in an embodiment, where each monitoring task is assigned a priority (which can vary according to the type of the task, and/or according to the resources usage), LMC 112 is operative to schedule and update the monitoring elements based upon their respective priorities. For example, in some embodiments, the LMC 112 may determine to not update the configuration parameters of a monitoring element even if the resources are overloaded. For example, monitoring data can be valuable in congestion or overload situations to enable troubleshooting, therefore LMC 112 may determine not to reduce the frequency of measurements in order to better assess and troubleshoot the elements that cause the overload or congestion. In another example, LMC 112 may determine to reschedule or update a subset of the monitoring element. In another example, when a monitoring element has completed executing a monitoring task, this can free up local/external resources and LMC 112 can re-configure and re-schedule the remaining monitoring elements if needed, or schedule new monitoring elements such (e.g., transferring monitoring data to external analytics system or databases, resuming passive monitoring, etc.). In another example, when traffic volume produced by an application unit is low, passive traffic capturing requires less resources compared to when the traffic volume is high. Therefore, when the usage status indicates that there is an increase in the use of the resources due to an increase of traffic volume, the LMC 112 can update the scheduling of a passive monitoring element to capture traffic at a lower frequency. Thus, in the embodiments presented herein, LMC 112 continuously observes resource usage and adapts the scheduling and configuration of the monitoring elements to resource usage changes.

Figure 4:
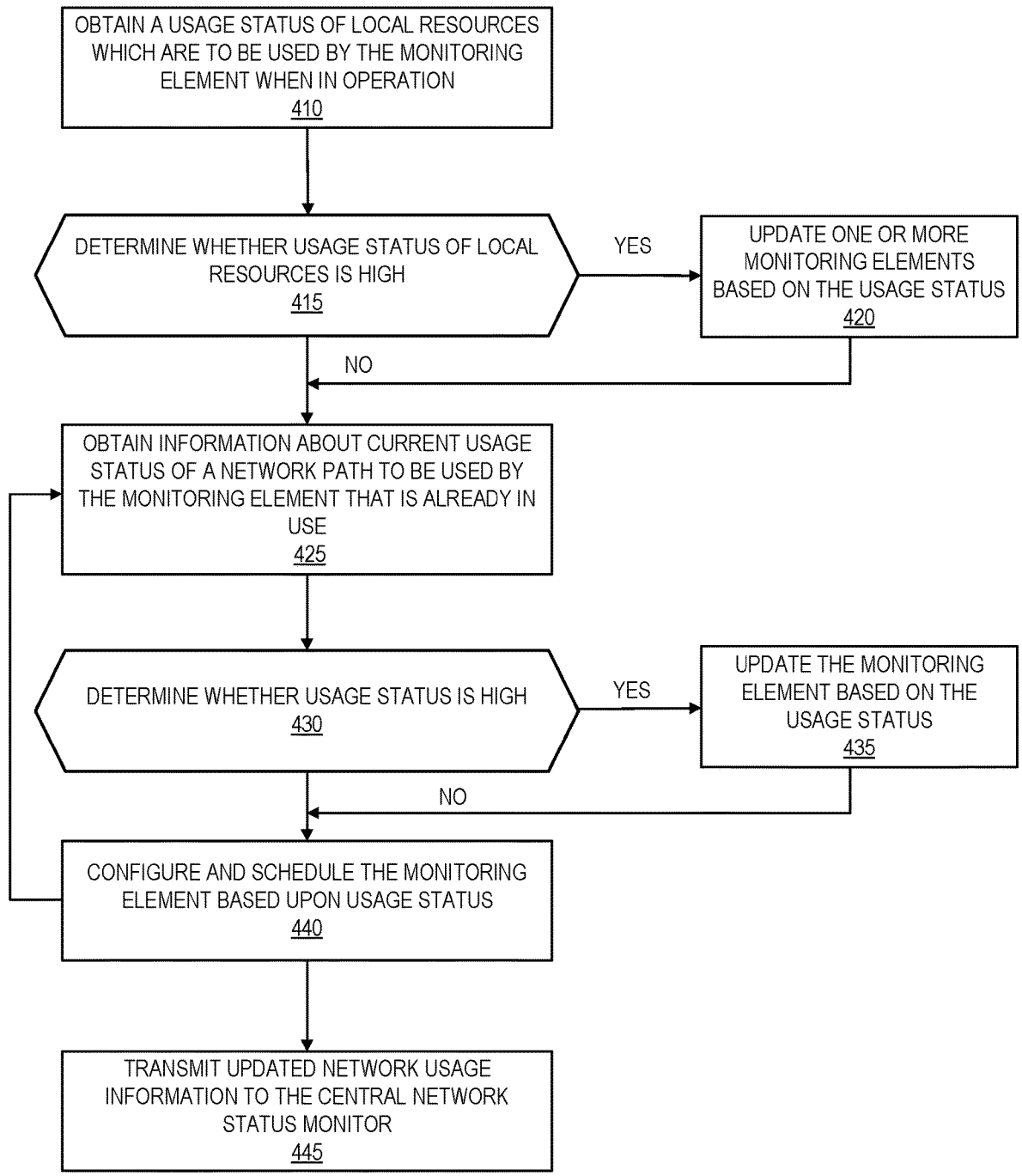
FIG. 4 illustrates an exemplary management of monitoring elements in accordance with one embodiment.

FIG. 4 illustrates an exemplary management of monitoring elements in accordance with one embodiment. In the example presented herein a request is received at LMC 112 for executing a monitoring element that measures Available Path Capacity (APC) between ND 101 and a remote network device. APC can be measured using an active network monitoring element. In operation, the APC monitoring element generates a train of probe packets which are transmitted over the network path to be measured and time-stamped at the source and at the destination.

In order to configure and schedule the APC monitoring element, the LMC 112 first obtains, at operation 410, the status of local resource usage. For example, LMC 112 obtains CPU usage and NIC capacity as generating probe packets uses these local resources. At operation 415, LMC 112 determines whether the local resource usage is high. When it is determined that the local resource usage is high, the LMC 112 updates one or more monitoring elements based on the local resource usage obtained. For example, the LMC 112 may determine to schedule the APC measurements for later. Alternatively, the LMC can decide to re-configure and re-schedule another ongoing monitoring task. For example, if the APC monitoring element is associated with a high priority, the LMC 112 may reconfigure a monitoring element with a lower priority with a slower measurement frequency or to be scheduled for a later time. For example, if passive traffic capturing is ongoing, the LMC can change the packet sampling rate to reduce the CPU usage.

Since APC is an active measurement, the LMC 112 further obtains (at operation 425) information about the status of the network. This information is obtained from CNSM 102. At operation 430, LMC 112 determines whether the resource usage is high. If overlapping active network measurements are ongoing on the same path as the new APC monitoring element is intending to measure, then the results will be biased and the overlapping measurements can cause congestion in the network and affect user application performance. Therefore, in this example, if the LMC 112 determines that there are overlapping measurements (i.e., the usage status of the external resources is high), the LMC 112 can update the APC monitoring element (operation 435). For example, LMC 112 can postpone the scheduling of the new APC monitoring element or configure the APC monitoring element to send packet trains with a lower frequency. When the LMC 112 initiates the APC monitoring element, it transmits (operation 445), updated network usage information to the central network status monitor and causes an update of the global resources that reflect the new measurement initiated in the network.

Architecture

Figure 7:
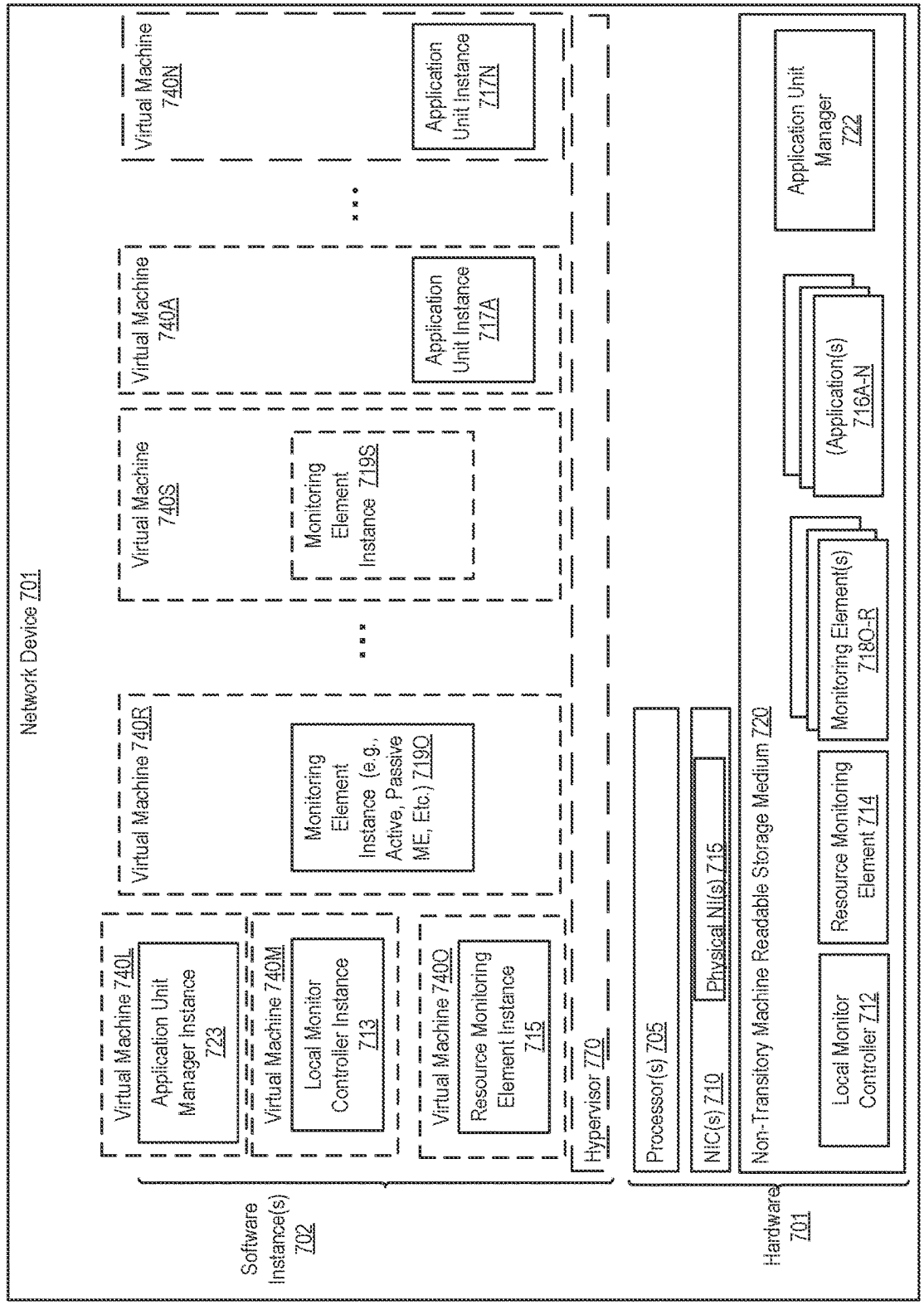
FIG. 7 is a diagram of one embodiment of a network device that can implement a network device 101, in accordance with one embodiment.

FIG. 7 is a diagram of one embodiment of a network device that can implement a network device 101, in accordance with one embodiment.

The network device 701 includes hardware 701 comprising a set of one or more processor(s) 705 (which are often commercial off-the-shelf COTS processors) and NIC(s) 710 (which include physical NIs 715), as well as non-transitory machine readable storage medium 720 having stored therein a Local Monitor Controller (LMC) 712, a resource monitoring element 714, one or more monitoring elements 7180-R. A physical NI 715 is hardware in a network device 701 through which a network connection (e.g., wirelessly through a wireless network interface controller (WNIC) or through plugging in a cable to a physical port connected to a NIC 710) is made. During operation, the processor(s) 705 may execute software to instantiate a hypervisor 770 (sometimes referred to as a virtual machine monitor (VMM)) and virtual machines 740L-N that are run by the hypervisor 770, which is collectively referred to as software instance 702. A virtual machine 740 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. The virtual machines 740, and that part of the hardware 901 that executes that virtual machine (be it hardware dedicated to that virtual machine and/or time slices of hardware temporally shared by that virtual machine with others of the virtual machine(s)), may form a separate virtual CNSM.

Network device 701 performs similar functionality as ND 101 of FIG. 1 and performs the operations described with reference to FIGS. 2-6. For instance, the hypervisor 770 may present a virtual operating platform that appears like networking hardware to virtual machine 740M, and the virtual machine 740M may be used to implement functionality of the LMC 112. While one embodiment implements virtualization with the hypervisor 770 and virtual machines 740L-N, alternative embodiments may use other techniques (e.g., using operating system level virtualization where, instead of a hypervisor and virtual machines, the kernel of the operating system allows for multiple user space instances (often called software containers, virtualization engines, virtual private servers, or jails) that may execute a virtualized ND 101.

Figure 8:
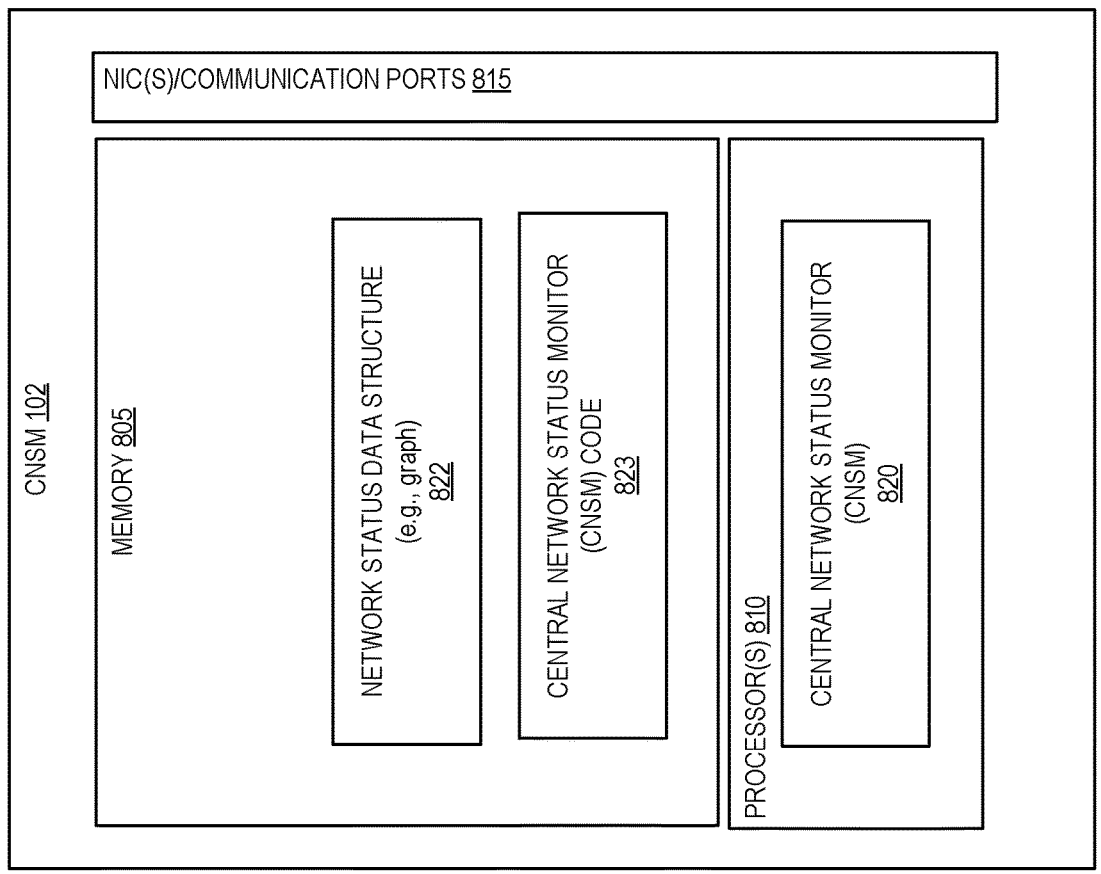
FIG. 8 is a diagram of one embodiment of a CNSM or network device that can implement network overlap detection and global resources visualization, in accordance with one embodiment.

FIG. 8 is a diagram of one embodiment of a CNSM or network device that can implement network overlap detection and global resources visualization, in accordance with one embodiment.

The physical (i.e., hardware) CNSM 102 is a network device that can perform some or all of the operations and methods described above for one or more of the embodiments. The physical CNSM 102 can include one or more network interface controllers (NICs; also known as network interface cards) 815, processor(s) ("processor circuitry") 810, memory 805, a Central Network Status Monitor 820.

The processor(s) 810 may include one or more data processing circuits, such as a general purpose and/or special purpose processor (e.g., microprocessor and/or digital signal processor). The processor(s) is configured to execute the Central Network Status Monitor 820, to perform some or all of the operations and methods described above for one or more of the embodiments, such as the embodiments of FIGS. 1-6. The Central Network Status Monitor 820, when executed by the processor 810 may create a network structure data structure 822 in the memory to store global view of the network and a mapping of associated monitoring elements. The processor can execute central network status monitor code 823 stored in the non-transitory computer readable medium, to perform some or all of the operations and methods described above.

Figure 9:
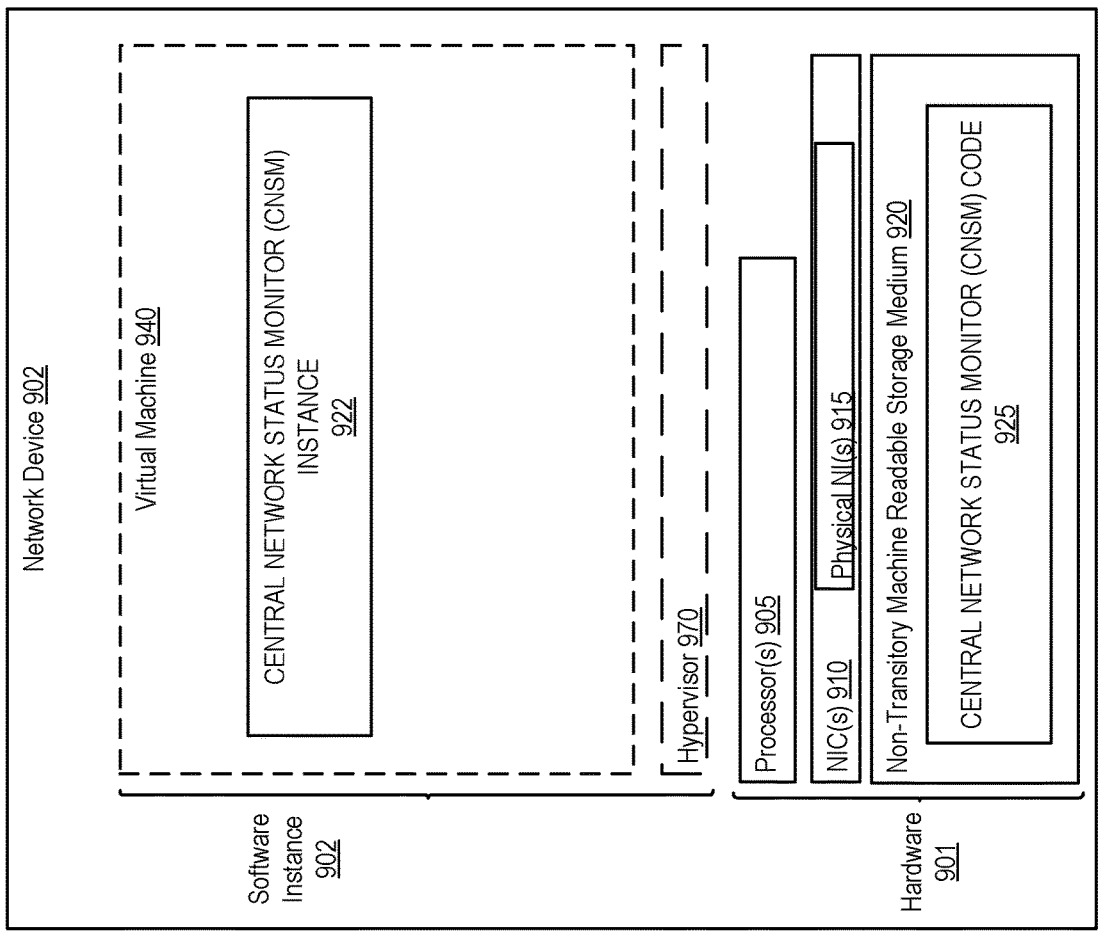
FIG. 9 is a diagram of one embodiment of a network device that can implement a virtual CNSM 102 that can implement network overlap detection and global resources visualization, in accordance with one embodiment.

FIG. 9 is a diagram of one embodiment of a network device that can implement a virtual CNSM 102 that can implement network overlap detection and global resources visualization, in accordance with one embodiment.

The network device 900 includes hardware 901 comprising a set of one or more processor(s) 905 (which are often commercial off-the-shelf COTS processors) and NIC(s) 910 (which include physical NIs 915), as well as non-transitory machine readable storage medium 920 having stored therein a Central Network Status Monitor Code 925. A physical NI 915 is hardware in a network device 900 through which a network connection (e.g., wirelessly through a wireless network interface controller (WNIC) or through plugging in a cable to a physical port connected to a NIC 910) is made. During operation, the processor(s) 905 may execute software to instantiate a hypervisor 970 (sometimes referred to as a virtual machine monitor (VMM)) and a virtual machine 940 that is run by the hypervisor 970, which is collectively referred to as software instance 902. A virtual machine 940 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. The virtual machines 940, and that part of the hardware 901 that executes that virtual machine (be it hardware dedicated to that virtual machine and/or time slices of hardware temporally shared by that virtual machine with others of the virtual machine(s)), may form a separate virtual CNSM.

A virtual CNSM performs similar functionality to the CNSM 102 illustrated in FIG. 8. For instance, the hypervisor 970 may present a virtual operating platform that appears like networking hardware to virtual machine 940, and the virtual machine 940 may be used to implement functionality of the Central Network Status Monitor. While one embodiment implements virtualization with the hypervisor 970 and virtual machines 940, alternative embodiments may use other techniques (e.g., using operating system level virtualization where, instead of a hypervisor and virtual machines, the kernel of the operating system allows for multiple user space instances (often called software containers, virtualization engines, virtual private servers, or jails) that may execute a virtualized CNSM.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for resource-aware dynamic monitoring of application units, the method comprising:
   (a) causing instantiation of a monitoring element operative to monitor an activity of one or more application units which are part of a network;
   (b) obtaining a first usage status of resources which are to be used by the monitoring element when in operation, wherein the resources are shared between the monitoring element and the one or more application units;
   (c) setting one or more configuration parameters of the monitoring element based upon the first usage status of the resources;
   (d) scheduling the monitoring element based upon the first usage status of the resources with the objective of avoiding contention on the resources that will be used by the monitoring element and the one or more application units when the monitoring element is in operation, wherein the scheduling the monitoring element causes the monitoring element to start monitoring the one or more application units at a predetermined start time;
   (e) obtaining a second usage status of the resources;
   (f) determining whether to update the monitoring element based upon the second usage status of the resources; and
   (g) responsive to determining that the monitoring element is to be updated, performing at least one of the following:
      (i) updating the one or more configuration parameters of the monitoring element based upon the second usage status of the resources, and
      (ii) rescheduling the monitoring element based upon the second usage status of the resources.

2. The method of claim 1, further comprising:
   receiving a monitoring request indicating a monitoring task to be performed by the monitoring element and further indicating the one or more application units to be monitored, wherein causing the instantiation of the monitoring element is performed in response to receiving the monitoring request.

3. The method of claim 1, wherein the method further comprises:
   instantiating a resource monitoring element prior to obtaining the first usage status of the resources and wherein the first usage status and the second usage status are obtained from the resource monitoring element.

4. The method of claim 1, wherein the resources include at least one of volatile memory, a non-transitory computer readable storage medium, a processor, and network resources used by the one or more application units.

5. The method of claim 1, further comprising periodically repeating operations (e), (f), and (g) until the monitoring element is no longer in operation.

6. The method of claim 1, wherein updating the one or more configuration parameters of the monitoring element includes updating a frequency of monitoring measurements to be performed by the monitoring element.

7. The method of claim 1, wherein rescheduling the monitoring element includes at least one of:
   delaying an execution of the monitoring element when a priority of the monitoring element is low; and
   expediting the execution of the monitoring element when the priority is high.

8. A non-transitory computer readable storage medium that provide instructions, which when executed by a processor, cause said processor to perform operations comprising:
   (a) causing instantiation of a monitoring element operative to monitor an activity of one or more application units which are part of a network;
   (b) obtaining a first usage status of resources which are to be used by the monitoring element when in operation, wherein the resources are shared between the monitoring element and the one or more application units;
   (c) setting one or more configuration parameters of the monitoring element based upon the first usage status of the resources;
   (d) scheduling the monitoring element based upon the first usage status of the resources with the objective of avoiding contention on the resources that will be used by the monitoring element and the one or more application units when the monitoring element is in operation, wherein the scheduling the monitoring element causes the monitoring element to start monitoring the one or more application units at a predetermined start time;
   (e) obtaining a second usage status of the resources;
   (f) determining whether to update the monitoring element based upon the second usage status of the resources; and
   (g) responsive to determining that the monitoring element is to be updated, performing at least one of the following:
      (i) updating the one or more configuration parameters of the monitoring element based upon the second usage status of the resources, and
      (ii) rescheduling the monitoring element based upon the second usage status of the resources.

9. The non-transitory computer readable storage medium of claim 8, wherein the operations further comprise:
   receiving a monitoring request indicating a monitoring task to be performed by the monitoring element and further indicating the one or more application units to be monitored, wherein causing the instantiation of the monitoring element is performed in response to receiving the monitoring request.

10. The non-transitory computer readable storage medium of claim 8, wherein the operations further comprise:
    instantiating a resource monitoring element prior to obtaining the first usage status of the resources and wherein the first usage status and the second usage status are obtained from the resource monitoring element.

11. The non-transitory computer readable storage medium of claim 8, wherein the resources include at least one of volatile memory, a non-transitory computer readable storage medium, a processor, and network resources used by the one or more application units.

12. The non-transitory computer readable storage medium of claim 8, wherein the operations further comprise repeating operations (e), (f), and (g) until the monitoring element is no longer in operation.

13. The non-transitory computer readable storage medium of claim 8, wherein updating the one or more configuration parameters of the monitoring element includes updating a frequency of monitoring measurements to be performed by the monitoring element.

14. The non-transitory computer readable storage medium of claim 8, wherein rescheduling the monitoring element includes at least one of:
 delaying an execution of the monitoring element when a priority of the monitoring element is low; and
 expediting the execution of the monitoring element when the priority is high.

15. A network device for resource-aware dynamic monitoring of application units, the network device being configured to:
 (a) cause instantiation of a monitoring element operative to monitor an activity of one or more application units which are part of a network;
 (b) obtain a first usage status of resources which are to be used by the monitoring element when in operation, wherein the resources are shared between the monitoring element and the one or more application units;
 (c) set one or more configuration parameters of the monitoring element based upon the first usage status of the resources;
 (d) schedule the monitoring element based upon the first usage status of the resources with the objective of avoiding contention on the resources that will be used by the monitoring element and the one or more application units when the monitoring element is in operation, wherein the scheduling the monitoring element causes the monitoring element to start monitoring the one or more application units at a predetermined start time;
 (e) obtain a second usage status of the resources;
 (f) determine whether to update the monitoring element based upon the second usage status of the resources; and
 (g) responsive to determining that the monitoring element is to be updated, perform at least one of the following:
  (i) update the one or more configuration parameters of the monitoring element based upon the second usage status of the resources, and
  (ii) reschedule the monitoring element based upon the second usage status of the resources.

16. The network device of claim 15, wherein the network device is further configured to:
 receive a monitoring request indicating a monitoring task to be performed by the monitoring element and further indicating the one or more application units to be monitored, wherein causing the instantiation of the monitoring element is performed in response to receiving the monitoring request.

17. The network device of claim 15, wherein the network device is further configured to:
 instantiate a resource monitoring element prior to obtaining the first usage status of the resources and wherein the first usage status and the second usage status are obtained from the resource monitoring element.

18. The network device of claim 15, wherein the resources include at least one of volatile memory, a non-transitory computer readable storage medium, a processor, and network resources used by the one or more application units.

19. The network device of claim 15, wherein the network device is further configured to repeat operations (e), (f), and (g) until the monitoring element is no longer in operation.

20. The network device of claim 15, wherein to update the one or more configuration parameters of the monitoring element includes updating a frequency of monitoring measurements to be performed by the monitoring element.

21. The network device of claim 15, wherein to reschedule the monitoring element includes at least one of:
 to delay an execution of the monitoring element when a priority of the monitoring element is low; and
 to expedite the execution of the monitoring element when the priority is high.

* * * * *